United States Patent Office 3,546,228
Patented Dec. 8, 1970

---

3,546,228
SUBSTITUTED 9,10-DIHYDROSPIRO[CYCLOPROPANE-1,10-ANTHRACENE] DERIVATIVES
Carl Kaiser, Haddon Heights, N.J., Charles L. Zirkle, Berwyn, Pa., assignors to Smith Kline & French Laboratories, Philadelphia, Pa., a corporation of Pennsylvania
No Drawing. Filed Dec. 18, 1968, Ser. No. 784,885
Int. Cl. C07d 51/70
U.S. Cl. 260—293    12 Claims

ABSTRACT OF THE DISCLOSURE 9,10 - dihydrospiro[cyclopropane-1,10-anthracene] derivatives in which the anthracene nucleus may have chloro, bromo, methyl, methoxy or trifluoromethyl substituents and the 9-position is substituted either by a tertiary aminopropyl or a 4-piperidyl moiety have antidepressant activity. The compounds are generally prepared by reaction of the appropriate amino Grignard reagent with a spiro-[cyclopropane-1,10-anthracene]-9-one followed by treatment of the 9-hydroxy intermediate with lithium aluminum hydride.

---

This invention relates to novel substituted 9,10-dihydrospiro[cyclopropane - 1,10 - anthracene] derivatives having useful pharmacodynamic activity. More specifically the compounds of this invention have antidepressant activity as demonstrated in standard animal pharmacological test procedures. Exemplary of this activity is the mydriasis, high body posture, hypertonia and hypothermia produced in rats upon oral administration of doses of 10 to 200 mg./kg. At these dose levels no toxicity is observed. The compounds of this invention also prevent reserpine induced ptosis in rats, characteristic of imipramine-like activity.

The compounds of this invention are represented by the following general structural formulas:

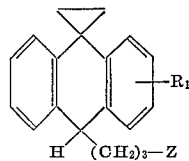
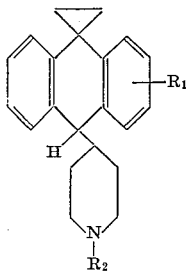

FORMULA I             FORMULA II in which:
Z represents dimethylamino, N-pyrrolidinyl, N-piperidinyl, N'-methyl-N-piperaxinyl, N'-(β-acetoxyethyl)-N-piperazinyl or N'-(β-hydroxyethyl)-N-piperazinyl;

$R_1$ represents hydrogen, chloro, bromo, methyl, methoxy or trifluoromethyl, preferably in the 2-position; and $R_2$ represents hydrogen, methyl or cyclopropylmethyl.

The compounds of this invention may be used in the form of a pharmaceutically acceptable acid addition salt having the utility of the free base. Such salts, prepared by methods well known to the art, are formed with both inorganic or organic acids, for example; maleic, fumaric, benzoic, ascorbic, pamoic, succinic, bismethylenesalicyclic, methanesulfonic, ethanedisulfonic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, sulfamic, phosphoric and nitric acids.

The compounds of this invention are generally prepared by reaction of a spiro[cyclopropane-1,10-anthracene]-9-one with an appropriate Grignard reagent to give the 9-hydroxy derivative which is treated with lithium aluminum hydride to yield the 9-substituted products of Formulas I and II. The following scheme illustrates the method of preparation employing spiro[cyclopropane-1,10-anthracene]-9-one and the Grignard reagent prepared from 3-dimethylaminopropyl chloride:

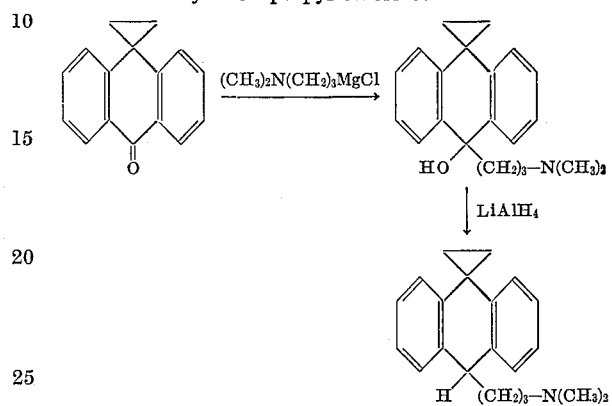

More specifically, to prepare the compounds of Formula I above the spiro[cyclopropane-1,10-anthracene]-9-one starting material is reacted with an aminopropyl magnesium halide, preferably chloride, in an inert organic solvent such as an ether, for example diethyl ether, dioxane or preferably tetrahydrofuran. The reaction is carried out at eleveated temperature such as about 35–100° C., conveniently at the reflux temperature of the solvent, for a reaction period of from about 1 to 4 hours. The reaction mixture is quenched in an aqueous solution of "Versene" (ethylenediaminetetraacetic acid) and extracted into an organic solvent such as ether to give the separated 9-hydroxy - 9 - aminoalkyl - 9,10-dihydrospiro[cyclopropane-1,10-anthracene] intermediates. Treating the hydroxy intermediates with lithium aluminum hydride in an organic solvent, preferably at the reflux temperature of the solvent employed, results in the formation of the 9-aminopropyl - 9,10-dihydrospiro[cyclopropane-1,10-anthracene] products of Formula I.

To prepare the N'-(β-hydroxyethyl)-N-piperazinyl-propyl compounds of Formula I the N'-(β-benxyloxyethyl)-N-piperazinylpropyl analogue is prepared as described above followed by catalytic hydrogenation to remove the benzyl group. Reacting the N'-(β-hydroxyethyl) derivatives with acetyl chloride in basic solution gives the acetoxyethyl compounds of Formula I.

The compounds of Formula II above are prepared by reaction of the spiro-[cyclopropane-1,10-anthracene]-9-one starting material with an N-methyl-4-piperidiyl magnesium halide, preferably chloride, in an inert organic solvent such as an ether, for example diethyl ether, dioxane or tetrahydrofuran. The reaction is carried out at from room temperature to the reflux temperature of the solvent, for from 30 minutes to 4 hours. The separated 9-hydroxy intermediate thus formed is treated with lithium aluminum hydride as described above to give the 9-(N-methyl-4-piperidyl) product.

To prepare the compounds of Formula II where $R_2$ is hydrogen, the corresponding products wherein $R_2$ is methyl prepared as described above are demethylated. This is accomplished by reaction with cyanogen bromide followed by acid hydrolysis of the resulting cyanamide which upon workup with dilute aqueous base gives the corresponding 9-(4-piperidyl) products. Further reaction of the latter with cyclopropane carbonyl chloride gives the corresponding carbonyl derivatives which are reduced with a bimetallic hydride to the cyclopropylmethyl analogues.

The aminoalcohols formed by the addition of the Grignard reagent as described above constitute a valuable part of this invention by virtue of their utility as intermediates to prepare the final products of Formulas I and II. These intermediates are represented by the following general structural formulas:

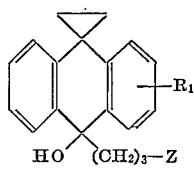

Formula III

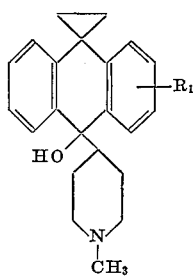

Formula IV in which:

Z represents dimethylamino, N-pyrrolidinyl, N-piperidinyl, N'-methyl-N-piperazinyl or N'-benzyloxyethyl-N-piperazinyl; and $R_1$ represents hydrogen, chloro, bromo, methyl, methoxy or trifluoromethyl.

The spiro[cyclopropane-1,10-anthracene]-9-one starting materials used as described hereinabove are prepared by the following general procedure. A 9-anthrone is heated with piperidine and then formaldehyde is added to give the 10-methylene-9-anthrone. The latter is reacted with dimethylsulfoxonium methylide (prepared by adding a suspension of sodium hydride in mineral oil to trimethylsulfoxonium iodide) to yield the spiroclopropyl starting material.

The 9-anthrones used as above are either known or prepared conveniently as illustrated by the following outline of the preparation of 2-trifluoromethyl-9-anthrone. Phenyl magnesium bromide is reacted with 2-bromo-4-trifluoromethylbenzonitrile to give 2-bromo-4-trifluoromethylbenzophenone. The latter is reduced with for example phosphorus and hydrogen iodide to yield 2-bromo-4-trifluoromethyl-diphenylmethane, which is reacted first with magnesium, then with carbon dioxide to give 2-benzyl-5-trifluoromethylbenzoic acid. Cyclization by acid treatment with for example concentrated sulfuric acid furnishes the 2-trifluoromethyl-9-anthrone.

The product compounds of this invention may be administered orally or parenterally in conventional dosage unit forms such as tablets, capsules, injectables or the like, by incorporating the appropriate dose of a compound of Formulas I or II with carriers according to accepted pharmaceutical practices.

The foregoing is a general description of how to prepare the compounds of this invention. The following examples illustrate the preparation of specific compounds having antidepressant activity. However this should not be construed as limiting the scope of the invention since appropriate variations in the starting materials will produce other corresponding products set forth hereinabove.

PREPARATIONS (A) Spiro[cyclopropane-1,10-anthracene]-9-one

A mixture of 200 g. of 9-anthrone in 100 ml. of methanol is stirred and heated to reflux and then 5 ml. of piperidine is added. Over a period of 75 minutes, 250 ml. of 37% aqueous formaldehyde solution is added and the resulting mixture is stirred and refluxed for 15 minutes. The reaction mixture is gradually cooled to about 35–40° C. and the solid 10-methylene-9-anthrone filtered off, M.P. 146–148° C.

To a solution of 136.4 g. of trimethylsulfoxonium iodide in 1400 ml. of dimethylformamide is added in portions 26.3 g. of 56.3% sodium hydride in mineral oil, keeping the temperature below 35° C. The mixture is stirred for 30 minutes at room temperature and a solution of 110.7 g. of 10-methylene-9-anthrone in 600 ml. of dimethylformamide is added, again keeping the temperature below 35° C. The resulting mixture is heated at 40–50° C. for 90 minutes, then poured into nine liters of water and filtered to give spiro[cyclopropane-1,10-anthracene]-9-one, M.P. 148–150° C.

(B) $R_1$-substituted-spiro[cyclopropane-1,10-anthracene]-9-ones

By employing in Part A, $R_1$-substituted-9-anthrone with similar subsequent reaction there are obtained the corresponding $R_1$ - substituted-spiro[cyclopropane-1,10-anthracene]-9-one starting materials. Thus, any of the following known 9-anthrones are used for this purpose: 1-, 2-, 3- or 4-chloro-9-anthrone, 2-, 3- or 4-methyl-9-anthrone; 1-, 2-, 3- or 4-bromo-9-anthrone; 1-, 2- or 4-methoxy-9-anthrone; 2-trifluoromethyl-9-anthrone.

EXAMPLE 1

To the Grignard reagent formed from 1.4 g. (0.058 m.) of magnesium turnings and 7.1 g. (0.058 m.) of 3-dimethylaminopropyl chloride in 50 ml. of tetrahydrofuran (after one and one-half hours refluxing and stirring under nitrogen) is added slowly a solution of 8.5 g. (0.0386 m.) of spiro[cyclopropane-1,10-anthracene]-9-one in 50 ml. of tetrahydrofuran. The reaction mixture is heated and stirred for five hours, cooled to room temperature and quenched in a solution of 40 g. of "Versene" (ethylenediaminetetraacetic acid) in 300 ml. of water. This mixture is extracted with ether and the dried extract is concentrated (clouded with hexane) to yield the product, 9-hydroxy-9-(3 - dimethylaminopropyl)-9,10-dihydrospiro-[cyclopropane-1,10-anthracene], M.P. 107–109° C.

To a stirred suspension of 1.5 g. (0.0304 m.) of lithium aluminum hydride in 70 ml. of benzene is added a solution of 3.1 g. (0.0101 m.) of 9-hydroxy-9-(3-dimethylaminopropyl)-9,10-dihydrospiro[cyclopropane - 1,10 - anthracene] in 25 ml. of benzene and the mixture is stirred and refluxed for two hours. The reaction mixture is decomposed with water, filtered and the filtrate evaporated in vacuo. The residue is distilled to give 9-(3-dimethylaminopropyl)-9,10-dihydrospiro[cyclopropane - 1,10 - anthracene], B.P. 160° C. (0.5 mm.).

Similarly, by employing 9.0 g. of 2-methyl-spiro[cyclopropane-1,10-anthracene]-9-one or 9.6 g. of 2-methoxy-spiro[cyclopropane-1,10-anthracene]-9-one in the above reaction sequence there are obtained the corresponding 2-methyl or 2-methoxy alcohol intermediates and 2-methyl-9-(3-dimethylaminopropyl)-9,10 - dihydrospiro[cyclopropane-1,10-anthracene] and 2-methoxy-9-(3-dimethylaminopropyl)-9,10-dihydrospiro[cyclopropane - 1,10-anthracene], respectively.

EXAMPLE 2

To the Grignard reagent formed from 1.4 g. of magnesium turnings and 7.1 g. of 3-dimethylaminopropyl chloride in tetrahydrofuran is added 9.8 g. of 2-chloro-spiro[cyclopropane-1,10-anthracent]-9-one in tetrahydrofuran solution. Following the reaction, the mixture is worked up as described in Example 1 to give 2-chloro-9-hydroxy-9 - (3-dimethylaminopropyl) - 9,10-dihydrospiro [cyclopropane-1,10-anthracene].

A solution of 3.6 g. of the above prepared 9-hydroxy spirocyclopropyl anthracene in benzene is reacted with a suspension of 1.5 g. of lithium aluminum hydride in benzene as described in Example 1 to give 2-chloro-9-(3-dimethylaminopropyl) - 9,10-dihydrospiro[cyclopropane-1, 10-anthracene].

Similarly, reaction of 11.5 g. of 2-bromo-spirol[cyclopropane-1,10-anthracene]-9-one as described above yields the corresponding 2-bromo-9-(3-dimethylaminopropyl)-9,10-dihydrospiro[cyclopropane-1,10-anthracene].

EXAMPLE 3

A solution of 8.5 g. of spiro[cyclopropane-1,10-anthracene]-9-one in tetrahydrofuran is added to a tetrahydrofuran solution of the Grignard reagent formed from 10.2 g. of 3-(4-methyl-1-piperazinyl)-propyl chloride and 1.4 g. of magnesium. The resulting mixture is refluxed for six hours and decomposed as described in Example 1 to give 9-hydroxy-9 - [3-(4-methyl-1-piperazinyl)-propyl] - 9,10-dihydrospiro[cyclopropane-1,10-anthracene]. The latter is reacted with excess lithium aluminum hydride in benzene to give 9-[3-(4-methyl-1-piperazinyl)-propyl]-9,10-dihydrospiro[cyclopropane-1,10-anthracene].

Similarly, employing 11.1 g. of 2-trifluoromethylspiro[cyclopropane-1,10-anthracene]-9-one as described above results in the formation of 2-trifluoromethyl-9-[3-(4-methyl-1-piperazinyl)-propyl] - 9,10-dihydrospiro[cyclopropane-1,10-anthracene], following reaction of the corresponding 9-hydroxy intermediate with lithium aluminum hydride.

EXAMPLE 4

A mixture of 1.4 g. of magnesium and 7.7 g. of 4-chloro-1-methylpiperidine in tetrahydrofuran is refluxed for two hours and 8.5 g. of spiro[cyclopropane-1,10-anthracene]-9-one is added in portions. The resulting mixture is refluxed and then worked up as described in Example 1 to yield 9-hydroxy-9-(1-methyl-4-piperidyl)-9,10-dihydrospiro[cyclopropane-1,10-anthracene].

The above prepared piperidyl derivative is reacted with lithium aluminum hydride according to the procedure of Example 1 to give 9-(1-methyl-4-piperidyl)-9,10-dihydrospiro[cyclopropane-1,10-anthracene].

Similarly, by employing 8.5 g. of 3-(1-pyrrolidinyl)-propylchloride or 9.3 g. of 3-(1-piperidinyl)-propyl chloride instead of the 4-chloro-1-methylpiperidine as described above there is obtained as products 9-[3-(1-pyrrolidinyl)-propyl] - 9,10-dihydrospiro[cyclopropane - 1,10-anthracene] and 9-[3-(1-piperidinyl)-propyl]-9,10-dihydrospiro[cyclopropane-1,10-anthracene], respectively.

EXAMPLE 5

A solution of 8.5 g. of spiro[cyclopropane-1,10-anthracene]-9-one in tetrahydrofuran is added to a tetrahydrofuran solution of the Grignard reagent formed from 1-benzyloxyethyl-4-(3-chloropropyl)-piperazine and magnesium and the resulting mixture is refluxed for six hours. Working up as in Example 1, there is obtained 9-hydroxy-9-[3-(4-benzyloxyethyl-1-piperazinyl)-propyl] - 9,10-dihydrospiro[cyclopropane - 1,10 - anthracene]. Heating this compound with lithium aluminum hydride in benzene yields 9-[3-(4-benzyloxyethyl-1-piperazinyl)-propyl]9,10-dihydrospiro[cyclopropane - 1,10-anthracene]. Hydrogenating the benzyloxy derivative using palladium-on charcoal catalyst in ethanol gives 9-[3-(4-hydroxyethyl-1-piperazinyl)-propyl] - 9,10-dihydrospiro[cyclopropane-1,10-anthracene].

Reacting the hydroxyethyl piperazine with acetyl chloride in pyridine furnishes the corresponding acetoxyethyl piperazine compound.

EXAMPLE 6

A solution of 9.5 g. of 9-(1-methyl-4-piperidyl)-9,10-dihydrospiro[cyclopropane-1,10-anthracene] in 50 ml. of dry benzene is added dropwise to a stirred solution of 3.6 g. of cyanogen bromide in 15 ml. of benzene at room temperature. After the addition is complete the mixture is stirred for 90 minutes and allowed to stand overnight. Following addition of 75 ml. of absolute ether, the product 9-(1-cyano-4-piperidyl) - 9,10-dihydrospiro[cyclopropane-1,10-anthracene], is collected.

To a solution of 150 ml. of glacial acetic acid, 100 ml. of water and 15 ml. of concentrated hydrochloric acid is added 6.5 g. of the above cyano compound and the mixture is heated to reflux for 16 hours. The reaction mixture is concentrated and then treated with 100 ml. of 10% aqueous sodium hydroxide solution to give 9-(4-piperidyl)-9,10-dihydrospiro[cyclopropane-1,10-anthracene].

EXAMPLE 7

A mixture of 1.1 g. of cyclopropanecarbonyl chloride and 3.1 g. of 9-(4-piperidyl)-9,10-dihydrospiro[cyclopropane-1,10-anthracene] in 25 ml. of pyridine is warmed on the steam bath for one hour. The reaction mixture is poured into dilute sodium hydroxide solution and extracted with methylene chloride. The organic extract is washed with water, dried and evaporated in vacuo to give 9-(1-cyclopropanecarbonyl-4-piperidyl) - 9,10 - dihydrospiro[cyclopropane-1,10-anthracene].

The latter compound is dissolved in ether and refluxed with a stirred suspension of lithium aluminum hydride in ether for four hours. The reaction mixture is decomposed, filtered and the filtrate concentrated in vacuo to yield 9-(1-cyclopropylmethyl-4-piperidyl) - 9,10 - dihydrospiro[cyclopropane-1,10-anthracene].

What is claimed is:

1. A chemical compound having one of the following structural formulas:

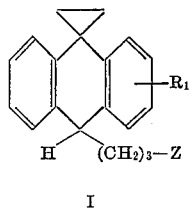 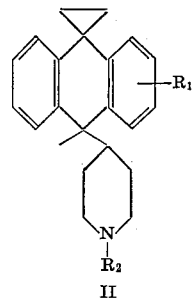

or a pharmaceutically acceptable acid addition salt thereof wherein:

Z is dimethylamino, N-pyrrolidinyl, N-piperidinyl, N'-methyl-N-piperazinyl, N'-(β-acetoxyethyl)-N-piperazinly or N'-(β-hydroxyethyl)-N-piperazinyl;

$R_1$ is hydrogen, chloro, bromo, methyl, methoxy or trifluoromethyl; and $R^2$ is hydrogen, methyl or cyclopropylmethyl.

2. A chemical compound in accordance with claim 1 in which $R_1$ is in the 2-position.

3. A chemical compound in accordance with claim 2 having the Formula I.

4. A chemical compound in accordance with claim 3 in which Z is dimethylamino.

5. A chemical compound in accordance with claim 4 in which $R_1$ is hydrogen.

6. A chemical compound in accordance with claim 2 having the Formula II.

7. A chemical compound in accordance with claim 6 in which $R_1$ is hydrogen and $R_2$ is methyl.

8. A chemical compound having one of the following structural formulas:

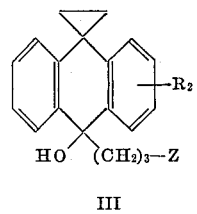 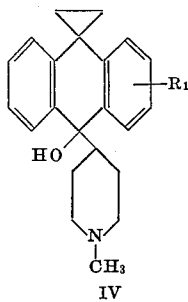

wherein:
Z is dimethylamino, N-pyrrolidinyl, N-piperdinyl, N'-methyl-N-piperazinyl or N'-benzyloxyethyl-N-piperazinyl; and
$R_1$ is hydrogen, chloro, bromo, methyl, methoxy or trifluoromethyl.

9. A chemical compound in accordance with claim 8 having the Formula III.

10. A chemical compound in accordance with claim 9 in which $R_1$ is hydrogen and Z is dimethylamino.

11. A chemical compound in accordance with claim 8 having the Formula IV.

12. A chemical compound in accordance with claim 11 in which $R_1$ is hydrogen.

References Cited

UNITED STATES PATENTS

| | | | |
|---|---|---|---|
| 2,403,483 | 7/1946 | Cusic | 260—570.8 |
| 2,647,896 | 8/1953 | Stauffer et al. | 260—247 |
| 3,340,268 | 9/1967 | Mizzoni | 260—293.4 |
| 3,419,604 | 12/1968 | Kaiser et al. | 260—501.1 |

HENRY R. JILES, Primary Examiner

G. T. TODD, Assistant Examiner

U.S. Cl. X.R.

260—268, 326.5, 326.87, 570.8, 590, 294.7; 424—250, 267, 274, 324